2,951,074
Patented Aug. 30, 1960

2,951,074
C¹⁴ CORTICAL STEROIDS AND METHODS OF PREPARING SAME

John M. Chemerda, Metuchen, and Ralph F. Hirschmann, Scotch Plains, N.J., and Nathan G. Steinberg, Brooklyn, N.Y., assignors to Merck & Co., Inc., Rahway, N.J., a corporation of New Jersey No Drawing. Filed Apr. 30, 1958, Ser. No. 731,883

37 Claims. (Cl. 260—239.55)

This invention relates to new steroid compounds, to processes for preparing such compounds and to methods of utilizing such new substances in the synthesis of useful physiologically-active steroids. More particularly, it relates to a novel synthesis of radioactive steroids and to the intermediates produced therein. Still more specifically, it is concerned with methods for making anti-inflammatory steroids of the pregnane series having a radioactive carbon atom at the C-4 position of the steroid nucleus.

The gluco corticoid and anti-inflammatory activity of cortisone, hydrocortisone, the 9-halo derivatives thereof and related compounds are well-known. It is highly desirable for the medical and biochemical work that is conducted on cortical hormones that there be readily and conveniently available radioactive forms of such hormones so that their mode of action and distribution in the body can be ascertained. The synthesis of radioactive cortisone, hydrocortisone and derivatives thereof heretofore available have not been entirely satisfactory. An object of this invention is to provide a new and novel synthesis of cortisone-4-C¹⁴, i.e. radioactive cortisone wherein the C-4 carbon atom is radioactive. It is a further object to provide a synthesis of similarly labelled anti-inflammatory steroids related to cortisone such as hydrocortisone, prednisone, prednisolone and the 9α-halo derivatives thereof. A still further object is the provision of new compounds which are key intermediates in such synthesis of radioactive cortical hormones. Other objects of the invention will be apparent from the detailed discussion and description hereinbelow.

The first phase of the process of our invention comprises the conversion of a Δ⁴-3-keto steroid of the pregnane series to a 3//5-4-norpregnan-3-oic acid and subsequent lactonization of said acid. These reactions are illustrated in the following flow diagram:

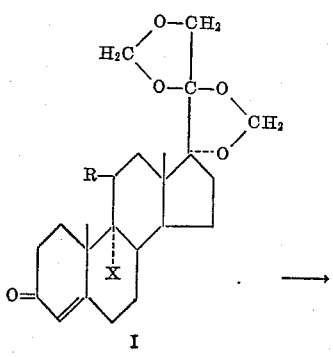

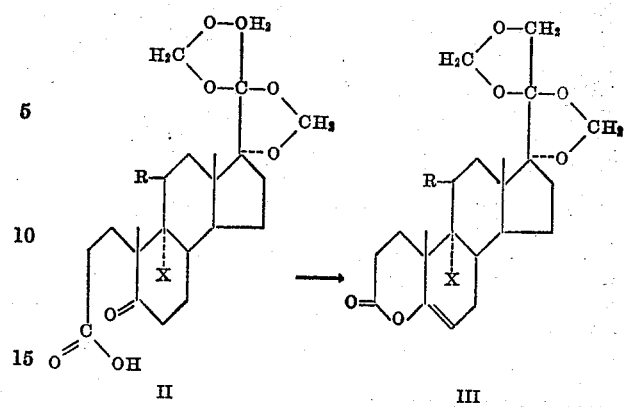

In the above structural formulae, R is intended to mean a keto or a hydroxy group, and X is intended to mean a hydrogen or halogen.

As starting materials in our process, we employ cortisone, hydrocortisone or the 9α-halo derivatives thereof wherein the 17α,21-dihydroxy-20-keto sidechain is blocked by formation of 17-20, 20-21-bismethylenedioxy moiety. Such 17-20, 20-21-bismethylenedioxy steroids are prepared by treating the parent compound with formaldehyde in the presence of a strong acid as described by Beyler et al., J.A.C.S., 80, 1517 (1958).

In the first step of the process the 17-20, 20-21-bis-methylenedioxy - 3 - keto - 11 - oxygenated - Δ⁴ - pregnene of structure I above is treated consecutively with ozone and with hydrogen peroxide to form a 17-20, 20-21 - bismethylenedioxy - 5 - keto - 11 - oxygenated - 3//5-4-norpregnan-3-oic acid of Formula II above, which latter compound is sometimes referred to hereinafter as the keto-acid. This reaction wherein the A ring of the steroid nucleus is opened and the keto acid formed is carried out by treating an organic solution of a compound of Formula I with ozone at temperatures of about −50 to about −10° C. The ozone is passed into the reaction medium until about one equivalent thereof has been utilized. The organic solvent employed for this reaction is not critical, although it should, of course, be one which is liquid at the reaction temperature and which is inert under the reaction conditions, i.e. does not react with ozone. For this purpose we prefer to employ methylene chloride although other solvents such as ethyl acetate, ethyl chloride, chloroform and acetic acid could be utilized. After completion of the ozonization stage of the process the reaction mass is brought to about room temperature and the organic solvent removed. The residual steroid ozonide is then oxidized with hydrogen peroxide in an organic solvent such as ethyl acetate. For this reaction we prefer to employ a slight excess of oxidizing agent and to allow the reaction to proceed at about room temperature for about 5–15 hours. The desired keto acid having the structural Formula II is then recovered by extraction and concentration techniques known in this art.

The keto acids obtained as described above may be conveniently purified by recrystallization from acetic acid. It is not essential, however, that the material which is employed in the second step of the process be of high purity and, for this reason, we prefer to utilize as an intermediate in our process the keto acid directly as obtained from the hydrogen peroxide reaction mixture.

The second step of our new process, i.e. lactonization of the keto acid II, is carried out with the C-17 sidechain of the steroid molecule protected as a 17-20, 20-

21-bismethylenedioxy derivative. It will be realized, however, that the bismethylenedioxy keto acids of Formula II may be converted to the parent compounds, the 5,20 - diketo - 17α,21 - dihydroxy - 11 - oxygenated - 3//5-4-norpregnan-3-oic acids, by treatment with an acid such as acetic or formic acid, or a mineral acid.

In the second step of the synthesis, the keto acids of Formula II are converted to 17-20, 20-21-bismethylenedioxy-Δ⁵-5-hydroxy - 11 - oxygenated - 3//5-4 - norpregnen-3-oic acid 3,5-lactones of structure III, hereinafter sometimes referred to as the 3,5-lactones. This reaction is carried out by warming the keto acid in the presence of an aliphatic acid anhydride and a base. We prefer to use acetic anhydride or propionic anhydride and a weak base such as an alkali metal acetate, or propionate, pyridine, triethylamine and the like. After completion of this reaction, the desired 3,5-lactone is recovered by removal of the solvent in vacuo. The product is purified by extraction and concentration techniques known to one skilled in this art, e.g. dissolution in a neutral solvent, extraction of inorganic salts with water and unchanged starting material with base, and subsequent removal of the organic solvent by vacuum concentration. The following products may be mentioned as typical of those obtainable in this fashion from the corresponding keto acid:

17-20, 20 - 21 - bismethylenedioxy-Δ⁵-5-hydroxy-11-keto-3//5-4-norpregnen-3-oic acid 3,5-lactone 17-20, 20 - 21 - bismethylenedioxy-Δ⁵-9α-fluoro-5,11-dihydroxy-3//5-4-norpregnen-3-oic acid 3,5-lactone 17-20, 20 - 21 - bismethylenedioxy-Δ⁵-9α-bromo-5,11-dihydroxy-3//5-4-norpregnen-3-oic acid 3,5-lactone 17-20, 20 - 21 - bismethylenedioxy-Δ⁵-9α-chloro-5,11-dihydroxy-3//5-4-norpregnen-3-oic acid 3,5-lactone 17-20, 20 - 21 - bismethylenedioxy-Δ⁵-5,11-dihydroxy-3//5-4-norpregnen-3-oic acid 3,5-lactone 17-20, 20 - 21 - bismethylenedioxy-Δ⁵-9α-fluoro-5-hydroxy-11-keto-3//5-4-norpregnen-3-oic acid 3,5-lactone These 17-20, 20-21-bismethylenedioxy compounds are readily converted to the corresponding 17α,21-dihydroxy-20-keto compounds by treatment with a strong acid such as a mineral acid, acetic acid or formic acid.

17-20, 20-21-bismethylenedioxy - Δ⁵ - 5 - hydroxy - 11-keto-3//5-4-norpregnen-3-oic acid 3,5-lactone and 17-20, 20-21 - bismethylenedioxy - Δ⁵-5,11β - dihydroxy - 3//5-4-norpregnen-3-oic acid 3,5-lactone are converted, according to the final phase of our process, to cortisone-4-C¹⁴ and hydrocortisone-4-C¹⁴:

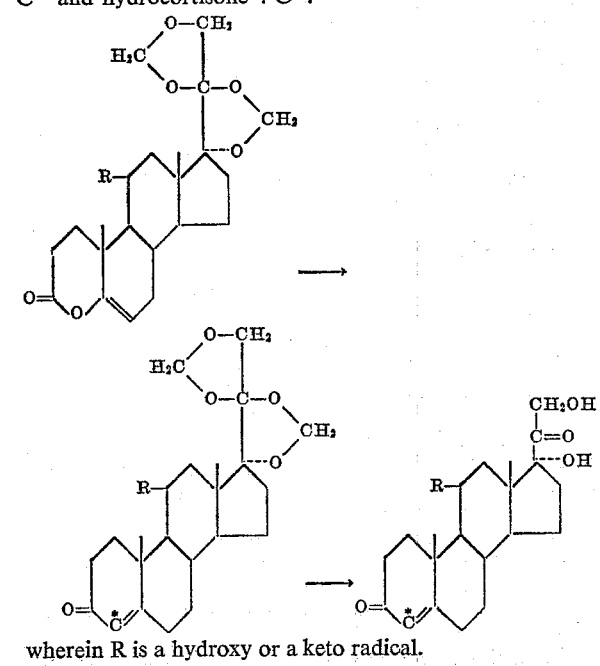

wherein R is a hydroxy or a keto radical.

This reaction is achieved by treating the 3,5-lactone with radioactive methyl magnesium halide (*CH₃MgX, where X is halogen) under the conditions of a Grignard reaction followed by treatment of the reaction mixture with a strong base. There is thus obtained the 17-20, 20-21-bismethylenedioxy derivative of radioactive cortisone or hydrocortisone which is transformed to the parent steroid with strong acid. We prefer to employ methyl magnesium bromide as the Grignard reagent and sodium hydroxide as the base.

It will be understood also that on reaction of these 3,5-lactones with a lower alkyl magnesium bromide and a base wherein the lower alkyl radical has at least two carbon atoms, also under Grignard conditions, there is obtained the 17-20, 20-21-bismethylendioxy derivative of 4-lower alkyl cortisone or hydrocortisone. Treatment of these latter substances with strong acid leads to removal of the bismethylenedioxy moiety and production of 4-lower alkyl steroids such as 4-methyl cortisone, 4-methyl hydrocortisone, 4-propyl cortisone and 4-propyl hydrocortisone.

The radioactive forms of cortisone and hydrocortisone obtained as described above, as well as the 4-lower alkyl steroids synthesized on reaction of the above 3,5-lactones with ethyl or propyl magnesium bromide, may be further treated by methods known in this art in order to introduce a double bond in the 1:2 position of the steroid nucleus, to reduce an 11-keto group to an 11β-hydroxy group, or to introduce a 9α-halo substituent.

The following examples are given for purposes of illustration and not by way of limitation:

EXAMPLE 1

*17-20, 20-21-bismethylenedioxy-5,11-diketo-3//5-4-norpregnan-3-oic acid (IIa)*

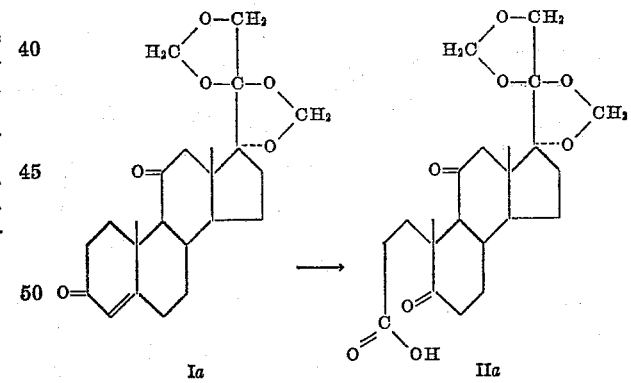

A solution of 68 grams of 17-20, 20-21-bismethylenedioxy-4-pregnene-3,11-dione in 408 ml. of methylene chloride is treated with ozone at −30° C. until about one equivalent of ozone has been introduced. The solvent is then removed in vacuo at room temperature and the residual amorphous solid dissolved in 3.18 liters of ethyl acetate and treated with 172 ml. of a solution of 30% hydrogen peroxide in methanol. The resulting mixture is allowed to stand at room temperature overnight. The solution is then concentrated in vacuo to a volume of about 200 ml., extracted with a saturated salt solution and then with a 5% solution of sodium carbonate. The alkaline extracts are acidified with concentrated hydrochloric acid. The acid (IIa) separates as a heavy oil. The supernatant is decanted and the oily residue is washed three times with water, and then extracted with ethyl acetate. The ethyl acetate extracts are washed with water and with a saturated solution of sodium chloride. Removal of the organic solvent by concentration in vacuo yields the keto acid IIa as an amorphous white solid.

EXAMPLE 2

*17-20, 20-21-bismethylenedioxy-11β-hydroxy-5-keto-3//5-4-norpregnan-3-oic acid (IIb)*

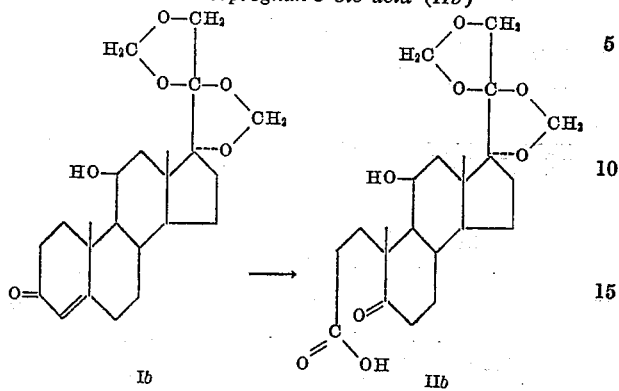

When 65 grams of 17-20, 20-21-bismethylenedioxy-4-pregnene-11β-ol-3-one are treated with ozone and then with hydrogen peroxide according to the procedure of Example 1, and the reaction mixture worked up as in Example 1, the keto acid IIb is obtained.

EXAMPLE 3

*17-20, 20-21-bismethylenedioxy-Δ⁵-5-hydroxy-11-keto-3//5-4-norpregnen-3-oic acid 3,5-lactone (IIIa)*

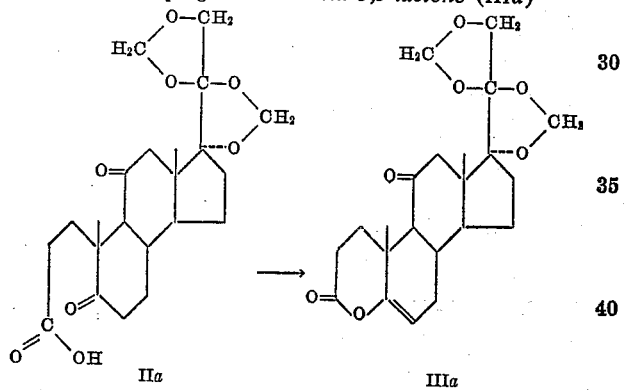

A mixture of 34 grams of keto acid IIa, obtained as described in Example 1, and 4.18 grams of sodium acetate in 1.4 liters of acetic anhydride is refluxed for about 20 minutes. The reaction mixture is then cooled and the acetic anhydride removed in vacuo at about 60–70° C. The residue thus obtained is dissolved in ethyl acetate and the solution washed with water and then with 5% sodium carbonate solution. On concentration of the organic solvent solution, there is obtained the lactone IIIa, melting point 232–235° C. The melting point is raised by recrystalization to 241–242° C.

*Anaylsis.*—Calcd.: C, 65.35; H, 6.93. Found: C, 65.40; H, 6.86.

EXAMPLE 4

*17-20, 20-21-bismethylenedioxy-Δ⁵-5,11β-dihydroxy-3//5-4-norpregnen-3-oic acid 3,5-lactone (IIIb)*

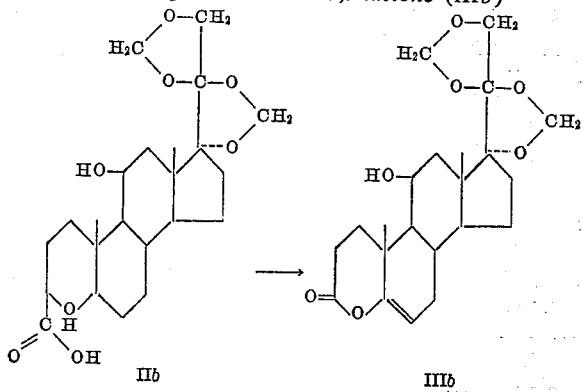

Fifteen grams of the keto acid (IIb) of Example 2 is refluxed for 30 minutes in a mixture of 600 ml. of acetic anhydride and 3 ml. of pyridine. The mixture is then cooled and concentrated almost to dryness in vacuo. The residue containing crude 3,5-lactone (IIIb) is extracted with ethyl acetate, and the extracts washed with water and with 5% sodium carbonate. The ethyl acetate solution is then concentrated in vacuo to dryness to give substantially pure IIIb.

EXAMPLE 5

*Cortisone-4-C¹⁴*

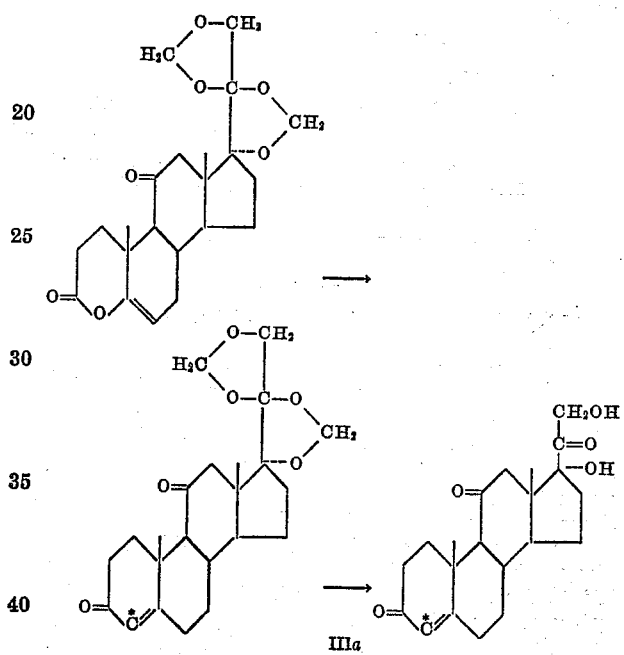

(A) Two grams of the lactone IIIa is dissolved in a mixture of 50 ml. of dry benzene and 50 ml. of ethyl ether. Radioactive methyl magnesium bromide (*CH₃MgBr)

in ether is added to the above mixture dropwise with stirring in a nitrogen atmosphere until 0.81 millimole have been added. The resulting mixture is stirred for 15 minutes. A saturated aqueous solution of ammonium sulfate is then added and the resulting layers separated. The ethereal layer is concentrated to substantial dryness in vacuo, and the residue thus obtained refluxed for a short time with methanolic sodium hydroxide. The alcohol is then removed by concentration in vacuo and the residue extracted with ethyl acetate. On concentration of the ethyl acetate there is obtained the 17-20, 20-21-bismethylenedioxy derivative of cortisone-4-C¹⁴ identical in melting point with the non-radioactive compound.

(B) 500 mg. of the 17-20, 20-21-bimethylenedioxy derivative of cortisone-4-C¹⁴ in 25 ml. of 15% acetic acid is heated at 100 C. in a nitrogen atmosphere for six hours. At the end of this time the reaction mixture is concentrated to dryness in vacuo, and the residue extracted several times with methylene chloride. The organic solvent extracts are combined and washed with cold water and with a saturated aqueous solution of sodium bicarbonate. On removal of the solvent in vacuo there is obtained cortisone-4-C¹⁴. The latter material may be purified by methods known in this art.

EXAMPLE 6

*Hydrocortisone-4-$C^{14}$*

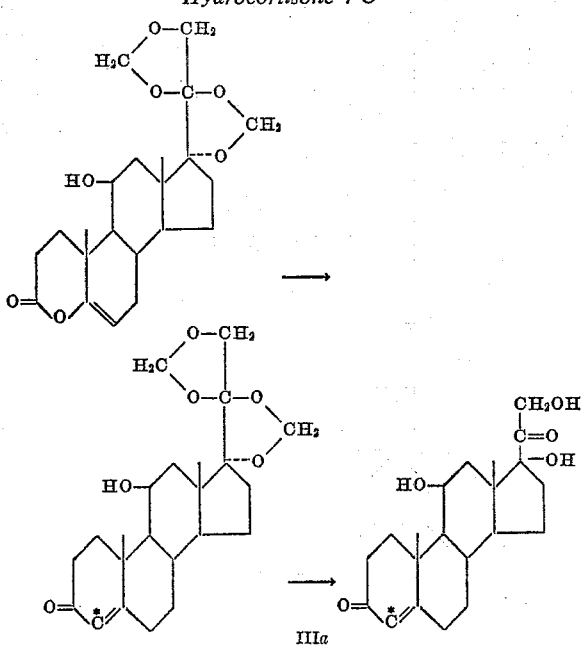

On reaction of the 3,5-lactone IIIb with radioactive methyl magnesium bromide (*$CH_3MgBr$) in a mixture of benzene-ether as described in Example 5 for Compound IIIa, the 17-20, 20-21-bismethylenedioxy derivative of hydrocortisone-4-$C^{14}$ is produced. This latter substance is converted to the parent compound, hydrocortisone-4-$C^{14}$ by heating with formic acid.

Thus, when one gram of the 17-20, 20-21-bismethylenedioxy derivative of hydrocortisone-4-$C^{14}$ is heated at about 75° C. for 30 minutes in 12 ml. of 98% formic acid, hydrocortisone-4-$C^{14}$ is formed, and may be isolated by extraction of the reaction mixture with methylene chloride and concentration of the methylene chloride extract to dryness in vacuo.

EXAMPLE 7

*17-20, 20-21-bismethylenedioxy-9α-fluoro-11β-hydroxy-5-keto-3//5-4-norpregnan-3-oic acid (IIc)*

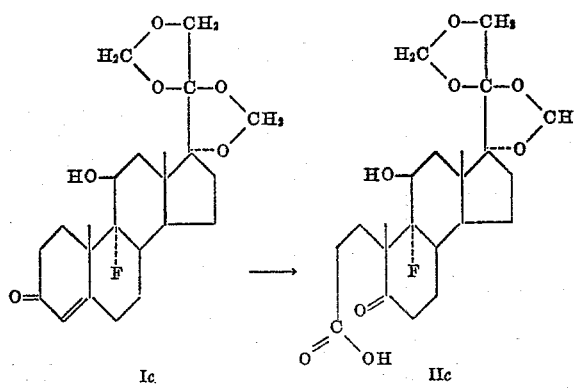

4.22 grams of 17-20, 20-21-bismethylenedioxy-9α-fluoro-4-pregnen-3-one-11β-ol is added to 200 ml. of methylene chloride and this mixture treated with ozone at a rate of 1 millimole of ozone per minute for 10.5 minutes at —30° C. It is then allowed to stand at room temperature for 30 minutes. The solution is evaporated to dryness in vacuo and the residue dissolved in 200 ml. of ethyl acetate. This solution is treated with 10.8 ml. of a 1:1 30% aqueous hydrogen peroxide-methanol solution and allowed to stand for about 36 hours. The resulting solution is then extracted with aqueous sodium carbonate after which the extracts are cooled and acidified with hydrochloric acid. Upon acidification the keto acid IIc precipitates, melting point 194° C. When this process is carried out using 17-20,20-21-bismethylenedioxy-9α-fluoro-4-pregnene-3,11-dione as starting material, there is obtained 17-20,20-21-bismethylenedioxy-9α-fluoro-5,11-diketo-3//5-4-norpregnan-3-oic acid.

EXAMPLE 8

*17-20, 20-21 - bismethylenedioxy-9α-fluoro-Δ⁵-5,11β-dihydroxy-3//5-4-norpregnen-3-oic acid 3,5-lactone (IIIc)*

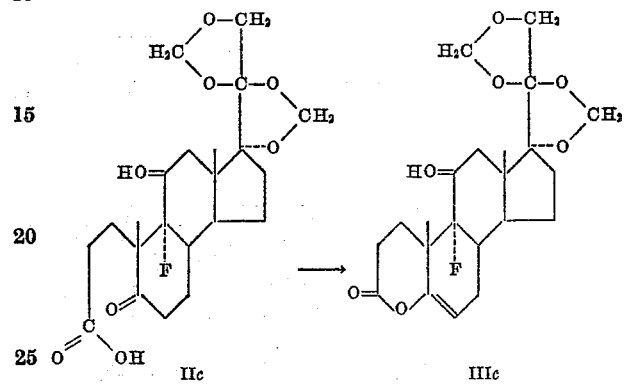

A mixture of 430 mg. of keto acid IIc obtained as in Example 7 and 48 mg. of sodium acetate are refluxed for 20 minutes in 16 ml. of acetic anhydride. The acetic anhydride is then removed in vacuo and the resulting residue distributed between ethyl acetate and sodium bicarbonate. The solvent layers are separated and the ethyl acetate extract concentrated to dryness in vacuo. The resulting lactone IIIc is recrystallized from a mixture of acetone and petroleum ether to give substantially pure material, melting point 261° C.

EXAMPLE 9

*17-20, 20-21 - bismethylenedioxy-9α-fluoro-Δ⁵-5-hydroxy-11-keto-3//5-4-norpregnen-3-oic acid, 3,5-lactone (IIId)*

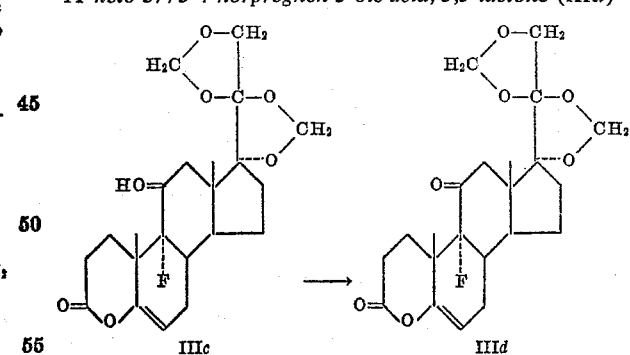

To a solution of 6.32 grams of chromium trioxide in 58 ml. of pyridine is added 3.4 grams of the lactone IIIc dissolved in 14 ml. of pyridine. The mixture is allowed to stand at room temperature for 15 hours. It is then concentrated to dryness under reduced pressure and the resulting residue extracted with ether. The ethereal extract is washed with water and then the ether solvent removed in vacuo to give the lactone IIId, melting point 244° C.

When the procedures set forth in Examples 7, 8 and 9 are carried out using as starting material the corresponding 9α-bromo or 9α-chloro compounds in place of the 9α-fluoro compounds of these examples, the reactions occur in the same manner to yield respectively the (a) 9α-bromo or 9α-chloro-17-20, 20-21-bismethylene dioxy-11β-hydroxy-5-keto-3//5-4-norpregnan-3-oic acid;

(b) 9α-bromo or 9α-chloro-17-20, 20-21-bismethylenedioxy-Δ⁵-5,11β-dithydroxy-3//5-4-norpregnen-3-oic acid 3,5-lactone;

(c) 9α-bromo or 9α-chloro-17-20, 20-21-bismethylenedioxy-Δ⁵-5-hydroxy-11-keto-3//5-4-norpregnen-3-oic acid 3,5-lactone.

EXAMPLE 10

*17-20, 20-21-bismethylenedioxy-5,11-diketo-3//5-norpregnan-3-oic acid (IIa)*

490 mg. of 17-20, 20-21-bismethylenedioxy-Δ⁵-5-hydroxy-11-keto-3//5-4-norpregnen-3-oic acid 3,5-lactone (IIIa) is treated with 18 ml. of aqueous methanolic potassium hydroxide at room temperature for three hours. The pH of the mixture is then adjusted to about 8 with dilute hydrochloric acid. The resulting solution is reduced to a small volume by concentration and the concentrate acidified with dilute hydrochloric acid. Upon addition of the hydrochloric acid the keto acid IIa crystallizes. After recrystallization of this material from aqueous acetic acid, it has a melting point of 176–177° C.

*Analysis.*—Calcd.: C, 62.54; H, 7.15. Found: C, 62.21; H, 7.09.

EXAMPLE 11

The compounds produced according to Examples 1-4 and 7-9 hereinabove are converted to the corresponding 17α,21-dihydroxy 20-keto compounds as follows:

One gram of the 17-20, 20-21-bismethylenedioxy 3,5-lactone or the keto acid is heated in about 90 ml. of 50% acetic acid for eight hours. The heating is carried out in a nitrogen atmosphere. At the end of this time the mixture is concentrated to dryness under reduced pressure to give the 17α,21-dihydroxy-20-keto compounds. If desired these substances may be further purified by recrystallization, alumina chromatography or conversion to the C-21 acetates with pyridine-acetic anhydride. Compounds prepared in this fashion include:

17α,21-dihydroxy-5,11,20-triketo-3//5-4-norpregnan-3-oic acid

9α-fluoro-11β,17α,21-trihydroxy-5,20-diketo - 3//5-4-norpregnan-3-oic acid

11β,17α,21 - trihydroxy-5,20-diketo-3//5-4-norpregnan-3-oic acid

Δ⁵-5,17α,21-trihydroxy-11,20-diketo-3//5-4-norpregnan-3-oic acid 3,5-lactone

9α-fluoro - Δ⁵-5,11β,17α,21-tetrahydroxy-20-keto - 3//5-4-norpregnen-3-oic acid 3,5-lactone Δ⁵-5,11β,17α,21-tetrahydroxy-20-keto-3//5-4-nonpregnen-3-oic acid 3,5-lactone

EXAMPLE 12

Certain of the compounds employed as starting materials, in the practice of this invention are described by Beyler et al., J. Am. Chem. Soc. 80, 1517 (1958). The 17-20, 20-21-bismethylenedioxy derivatives of cortisone, hydrocortisone and the 9α-halo derivatives thereof may be prepared as follows: Five grams of cortisone, hydrocortisone, or a 9α-halo derivative thereof is suspended in 400 ml. of chloroform, and 100 ml. of 40% aqueous formaldehyde and 100 ml. of concentrated hydrochloric acid are added thereto. The resulting two-phase reaction mixture is stirred at 25–30° C. for about 30 hours. The aqueous phase is made basic with aqueous sodium hydroxide, separated from the organic layer and extracted with chloroform. The chloroform phase and washes are combined, washed with aqueous sodium bisulfite and concentrated to dryness to give the 17-20, 20-21-bismethylenedioxy derivative of cortisone, hydrocortisone, or the 9α-halo derivatives thereof.

EXAMPLE 13

*4-methyl cortisone*

Two grams of lactone IIIa is dissolved in 50 ml. of dry benzene and 50 ml. of ethyl ether. To the resulting solution there is added in a nitrogen atmosphere with stirring 10.8 ml. of ethereal solution of ethyl magnesium bromide containing 0.075 millimole of ethyl magnesium bromide per mol. The addition is carried out over a period of 30 minutes and the mixture stirred at room temperature for an additional 15 minutes after addition is complete. To the resulting mixture there is added a saturated aqueous solution of ammonium sulfate. Two layers form and are separated. The aqueous layer is extracted with benzene and ethyl ether. These washings and the organic layer are combined, dried and evaporated to dryness in vacuo. The residual material is refluxed under nitrogen for about 15 minutes in a solution of 1.64 grams of sodium hydroxide in 16 ml. of water and 164 mol of methanol. The methanol is then removed in vacuo. The resulting concentrate is extracted with ethyl acetate, the organic extract washed with dilute sodium hydroxide and with water. The organic solvent is then removed and the residue triturated with ethyl ether to give about 0.6 gram of 17-20, 20-21-bismethylenedioxy derivative of 4-methyl cortisone, melting point 277–279° C. λ Max. 249, E% 353. This compound is treated with 60% formic acid to give 4-methyl cortisone, melting point 228–231° C. λ Max. 249, E% 415.

4-methyl cortisone is treated with semicarbazide and the resulting 3,20-semicarbazone reduced with sodium borohydride, and the carbonyl groups at C-3 and C-20 regenerated with pyruvic acid according to a method of Wendler et al., J.A.C.S. 73, 3818 (1951). Acetylation of the resulting material gives 4-methyl hydrocortisone acetate, melting point 154–156° C. λ Max. 252, E% 417.

Any departure from the above description which conforms to the present invention is intended to be included within the scope of the claims.

What is claimed is:

1. A compound having the formula

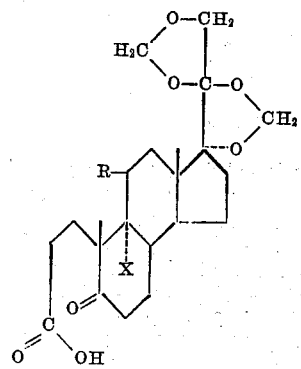

wherein R is selected from the class consisting of keto and hydroxy groups and X is selected from the class consisting of hydrogen and halogen.

2. A compound having the formula

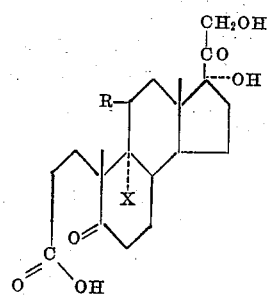

wherein R is selected from the class consisting of keto and hydroxy groups and X is selected from the class consisting of hydrogen and halogen.

3. 17-20, 20-21-bismethylenedioxy-5,11-diketo-3//5-4-norpregnan-3-oic acid.

4. 17α,21-dihydroxy-5,11,20 - triketo - 3//5 - 4 - norpregnan-3-oic acid.

5. 17-20,20-21-bismethylenedioxy-9α-fluoro - 11β - hydroxy-5-keto-3//5-4-norpregnan-3-oic acid.

6. 9α-fluoro-11β,17α,21-trihydroxy-5,20-diketo - 3//5-4-norpregnan-3-oic acid.

7. 17-20,20-21-bismethylenedioxy-11β - hydroxy - 5-keto-3//5-4-norpregnan-3-oic acid.

8. 11β,17α,21-trihydroxy-5,20-diketo - 3//5 - 4 - norpregnan-3-oic acid.

9. 17-20,20-21-bismethylenedioxy-9α-fluoro - 5,11 - diketo-3//5-4-norpregnan-3-oic acid.

10. A compound having the formula

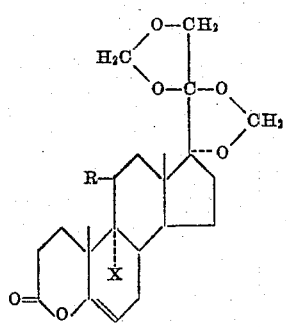

wherein R is selected from the class consisting of keto and hydroxy groups and X is selected from the class consisting of hydrogen and halogen.

11. A compound having the formula

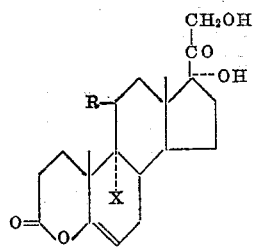

wherein R is selected from the class consisting of keto and hydroxy groups and X is selected from the class consisting of hydrogen and halogen.

12. 17-20, 20-21 - bismethylenedioxy-Δ⁵-5-hydroxy-11-keto-3//5-4-norpregnen-3-oic acid 3,5-lactone.

13. Δ⁵-5,17α,21 - trihydroxy - 11,20 - diketo-3//5-4-norpregnen-3-oic acid 3,5-lactone.

14. 17-20, 20-21-bismethylenedioxy-9α-fluoro-Δ⁵-5,11β-dihydroxy-3//5-4-norpregnen-3-oic acid 3,5-lactone.

15. 9α-fluoro-Δ⁵-5,11β,17α,21 - tetrahydroxy - 20 - keto-3//5-4-norpregnen-3-oic acid 3,5-lactone.

16. 17-20, 20-21 - bismethylenedioxy - Δ⁵-5,11β-dihydroxy-3//5-4-norpregnen-3-oic acid 3,5-lactone.

17. Δ⁵-5,11β,17α,21-tetrahydroxy - 20 - keto - 3//5-4-norpregnen-3-oic acid 3,5-lactone.

18. 17-20, 20-21-bismethylenedioxy - 9α - fluoro - Δ⁵-5-hydroxy-11-keto - 3//5-4 - norpregnen-3-oic acid 3,5-lactone.

19. The process which comprises treating a compound of the formula

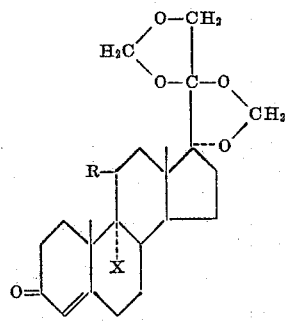

with about one equivalent of ozone, and treating the resulting ozonide with hydrogen peroxide thereby producing a compound having the formula

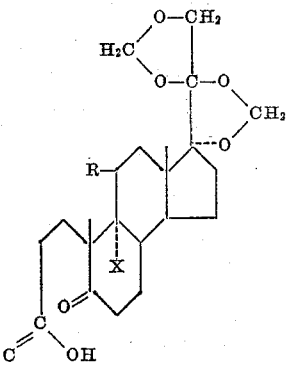

wherein R is selected from the class consisting of keto and hydroxy groups and X is selected from the class consisting of hydrogen and halogen.

20. The process of claim 19 wherein R is keto and X is hydrogen.

21. The process of claim 19 wherein R is hydroxy and X is hydrogen.

22. The process of claim 19 wherein R is hydroxy and X is fluorine.

23. The process which comprises treating a compound of the formula

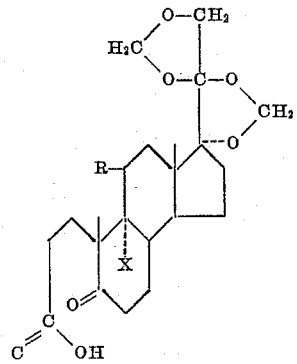

with a lower alkanoic acid anhydride in the presence of a base thereby producing a compound of the formula

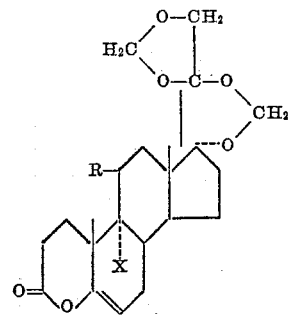

wherein R is selected from the class consisting of keto and hydroxy groups and X is selected from the class consisting of hydrogen and halogen.

24. The process of claim 23 wherein the lower alkanoic acid anhydride is acetic anhydride.

25. The process of claim 23 wherein R is keto and X is hydrogen.

26. The process of claim 23 wherein R is hydroxy and X is hydrogen.

27. The process of claim 23 wherein R is hydroxy and X is fluorine.

28. The process which comprises reacting 17-20, 20-21-bismethylenedioxy - Δ⁵ - 5 - hydroxy - 11 - keto - 3//5-4-norpregnen-3-oic acid 3,5-lactone with radio-active methyl magnesium halide and with base thereby producing the 17-20, 20-21-bismethylenedioxy derivative of cortisone-4-C[14].

29. The process which comprises reacting 17-20, 20,21-bismethylenedioxy - Δ[5] - 5 - hydroxy - 11 - keto - 3//5-4-norpregnen-3-oic acid 3,5-lactone with radio-active methyl magnesium halide and with base thereby producing the 17-20, 20-21-bismethylenedioxy derivative of cortisone-4-C[14], and treating said latter compound with a strong acid to produce cortisone-4-C[14].

30. The process of claim 29 wherein the acid is acetic acid.

31. The process that comprises reacting 17-20, 20-21-bismethylenedioxy - Δ[5] - 5,11β - dihydroxy - 3//5 - 4-norpregnen-3-oic acid 3,5-lactone with radio-active methyl magnesium halide and with base thereby producing the 17-20, 20-21-bismethylenedioxy derivative of hydrocortisone-4-C[14].

32. The process that comprises reacting 17-20, 20-21-bismethylenedioxy - Δ[5] - 5,11β - dihydroxy - 3//5 - 4-norpregnen-3-oic acid 3,5-lactone with radio-active methyl magnesium halide and with base thereby producing the 17-20, 20-21-bismethylenedioxy derivative of hydrocortisone-4-C[14] and treating said latter compound with a strong acid to produce hydrocortisone-4-C[14].

33. The process of claim 32 wherein the acid is formic acid.

34. A compound having the formula

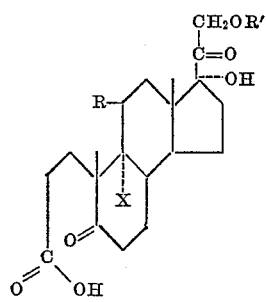

where R is selected from the class consisting of keto and hydroxy groups, R' is selected from the class consisting of hydrogen and acetoxy and X is selected from the class consisting of hydrogen and halogen.

35. A compound having the formula

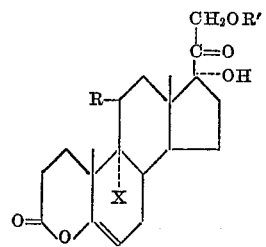

where R is selected from the class consisting of keto and hydroxy groups, R' is selected from the class consisting of hydrogen and acetoxy and X is selected from the class consisting of hydrogen and halogen.

36. The 17-20, 20-21-bismethylenedioxy derivative of cortisone-4-C[14].

37. The 17-20, 20-21-bismethylenedioxy derivative of hydrocortisone-4-C[14].

References Cited in the file of this patent

UNITED STATES PATENTS 2,803,632    Barkley    Aug. 20, 1957

OTHER REFERENCES

Thompson et al., 76, J.A.C.S., 1194–96 (1954).